United States Patent [19]

Hutting et al.

[11] Patent Number: 4,704,768
[45] Date of Patent: Nov. 10, 1987

[54] DECROPPING APPARATUS

[75] Inventors: Gerardus T. M. Hutting, Wijchen; Engelbertus J. J. M. Smulders, Boxmeer, both of Netherlands

[73] Assignee: Stork PMT B.V., An Boxmeer, Netherlands

[21] Appl. No.: 867,043

[22] Filed: May 27, 1986

[30] Foreign Application Priority Data

May 30, 1985 [NL] Netherlands ............... 8501556

[51] Int. Cl.⁴ ............... A22C 21/00; A22C 21/06
[52] U.S. Cl. ............................................. 17/11
[58] Field of Search ............................. 17/11, 56, 45

[56] References Cited

U.S. PATENT DOCUMENTS

| 3,175,244 | 3/1965 | Sharp et al. | 17/11 X |
| 3,705,440 | 12/1972 | Lewis | 17/11 |
| 4,208,764 | 6/1980 | Loth et al. | 17/11 X |
| 4,467,498 | 8/1984 | Graham et al. | 17/11 X |
| 4,610,050 | 9/1986 | Tieleman et al. | 17/11 |

Primary Examiner—Willie G. Abercrombie
Attorney, Agent, or Firm—Newton, Hopkins & Ormsby

[57] ABSTRACT

Method and device for removing the crop from the neck of slaughtered poultry, using an extractor to be inserted into the neck of the poultry, having a number of radially projecting parts and surrounded by a sheath with a longitudinal cutout.

9 Claims, 5 Drawing Figures

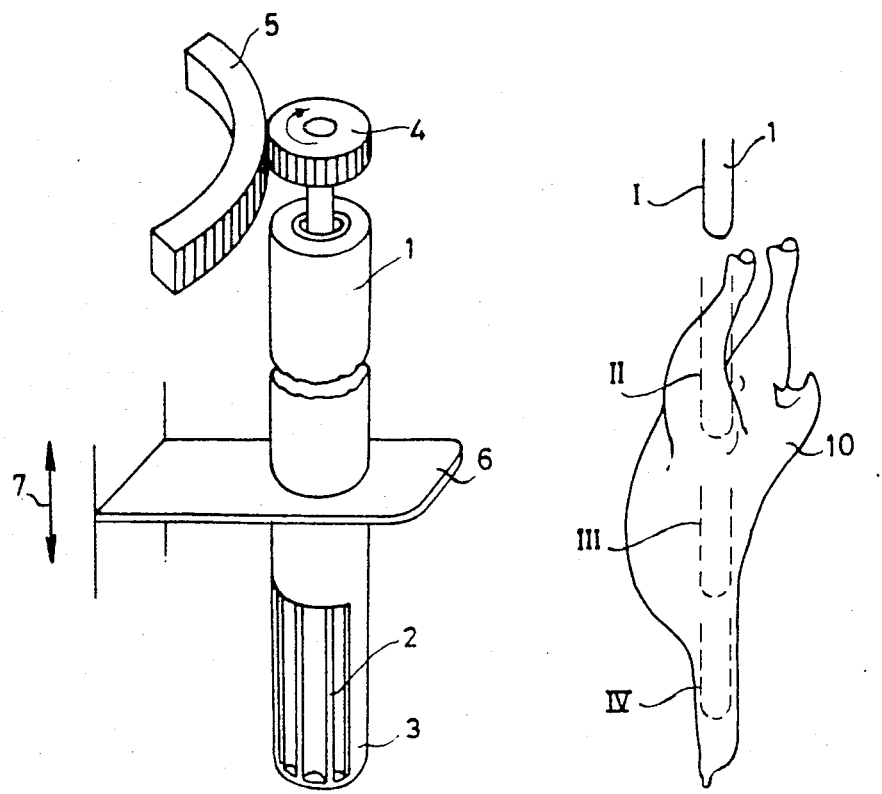
FIG. 1.
FIG. 3.
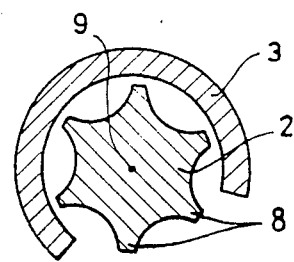
FIG. 2.

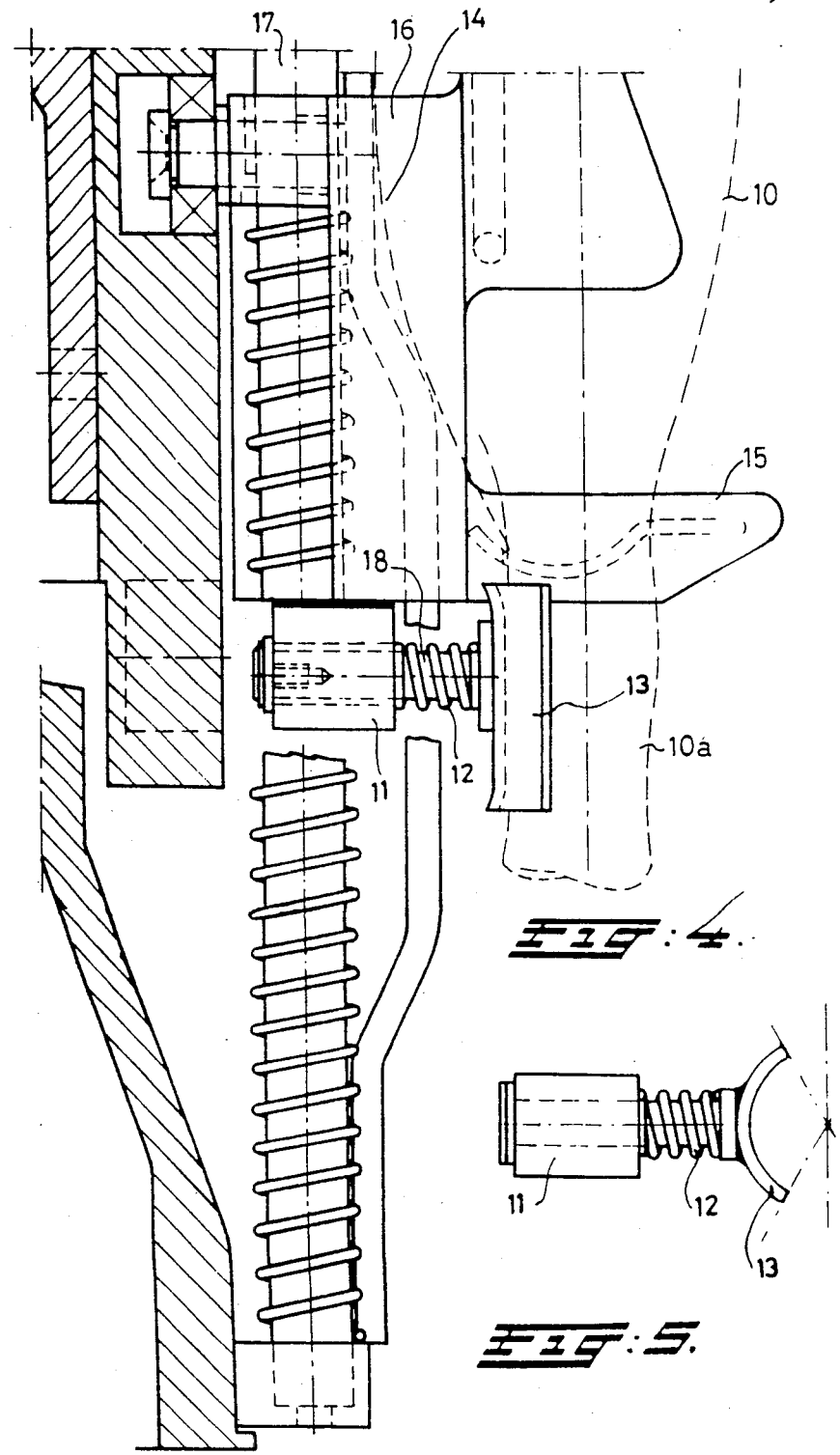

DECROPPING APPARATUS

BACKGROUND OF THE INVENTION

The invention relates to a method of removing inedible and/or undesirable parts from the neck of slaughtered poultry which have been degutted through an opening at the vent, wherein at least the operative part of a rotationally driven extractor is inserted into the neck portion via the extraction opening for the intestines and via the abdominal and chest cavity, and is removed from the bird together with parts from the neck region, and thereupon freed from the parts removed.

DESCRIPTION OF THE PRIOR ART

A method of this kind is known from Dutch Pat. Application No. 76.01640, in which it is described how an extractor is inserted so far into the abdominal and chest cavity that its operative part is situated at the height of the gullet part 23 between the stomach and the crop, and then by means of a rotary movement the gullet part is gripped and partly wound around the extractor, whereupon a clamp part of the latter is closed and the extractor then pulled back, so that by the application of a pulling movement to the clamped gullet part 23 and the crop 24 attached thereto the latter is pulled free and extracted. Before the connection between the crop 24 and the neck gullet part 25 is broken, both the neck gullet and the windpipe 26 will be detached from the wall of the throat. In a subsequent stage of the process, in which the bird's head 27 is removed, these parts will thus accompany the head.

This known method has the disadvantage that it can be applied only in cases where the gizzard 21, lying outside the bird, and the proventricule 22 attached thereto are still joined to the part of the gullet 23 of which the other end is still joined to the crop 24; in other words only when the gullet part 23 has not been broken during the preceding operation of extracting the intestines. There is however no certainty that the gullet part 23 will not have been broken, so that careful checking and a manual removal stage are still necessary.

SUMMARY OF THE INVENTION

The invention seeks to provide a method in which these disadvantages are overcome and which therefore ensures the removal of inedible and/or undesirable parts irrespective of the effectiveness of preceding operations. According to the invention this is achieved with a method which is characterized in that the extractor cooperates, at least during its rotation, with non-rotating protection and positioning means which are likewise inserted, so that only those parts which have to be removed coming into contact with the rotating extractor over a certain length, can be gripped by the extractor, while the operative path of the combination extends at least over the length of the crop in the neck.

In connection with the invention it is observed that it is known from Dutch Patent Application No. 83.03633 for a bird, which in previous operations has had the intestines and the head removed, to be freed of any parts left behind in the neck part, such as the crop, the gullet and the windpipe, by insertion through the extraction opening of a rotating extractor, which is pulled through the neck and which is provided at the front end with substantially axial cutouts enabling the parts remaining behind to be gripped firmly and removed from the neck. Because of the shape of the extractor used, this known method has the disadvantage that the neck may also be damaged in places where there are no parts requiring removal. This is particularly the case when some degree of rigor mortis has already occurred in the slaughtered animal and the neck is curved. Such undesirable damage increases the risk of infection and impairs the keeping properties of the bird. Moreover, the skin of the neck suffers damage which is visible externally, so that the appearance of the product is disadvantageously affected.

A very advantageous method according to the invention is achieved if in accordance with the invention the extractor rotates in the same direction during both the forward and the return travel of the combination. By this means the probability of the gripping of the parts which are to be removed is further increased.

Important advantages of the method adopted are that the likelihood of undesirable damage is reduced to a minimum, the operation is carried out very hygienically and accurately through direct gripping and enclosure of, in particular, the crop and its contents, great accuracy is achieved through direct aiming at the target, and that the method can be applied in any poultry processing plant. Moreover, it can be regarded as an advantage that the aimed action of the extractor, resulting from the positioning function of the means employed in relation to the parts which are to be removed, reduces to the minimum the probability of parts being left behind. It is in addition observed that the method can be applied to slaughtered poultry whether or not the head is removed.

The invention also relates to the extraction means provided with a rotating extractor for applying the method according to the invention, in an installation at least comprising a guide for a chain or cable conveyor carrying slaughtered poultry suspended thereon by the legs, bird positioning and fastening means, and also drive means for the extraction means. The extraction means used in this arrangement are according to the invention characterized in that each rotationally drivable extractor is surrounded by a non-rotating protective sheath having a cross-section adapted to be passed through the neck of the bird and provided in one position with a cutout.

The rotating extractor and the protective sheath are mounted and joined to be immovable relative to one another, particularly in the longitudinal direction.

However, the fastening of the protective sheath in this arrangement is advantageously adjustable about its longitudinal axis, so that the parts which are to be removed will lie in front of the cutout in the protective sheath of the combination inserted into the neck, and these parts will be pressed against the rotating extraction device by the taut skin of the neck.

The longitudinal cutout in the protective sheath is disposed at the end remote from the drive side, said end being rounded and closed, while leaving free an opening merging into the longitudinal cutout. This provides not only good protection against the action of the rotating extractor where such action is not required, and also good guiding and positioning of the parts requiring removal in relation to the rotating extractor.

At least at the site of the cutout in the protective sheath the rotating extractor is provided with one or more substantially radially projecting parts, which with a certain clearance extend to the inside of the protective sheath. This has the effect that as soon as any part of the organs which are to be removed is brought by the rotating extractor to a position between these projecting parts and the inside of the protective sheath, these organs will be clamped therebetween and displaced, so that they can be pulled off the skin of the neck by the application of a powerful force.

The projecting parts may be of various shapes. In one advantageous embodiment they are in the form of flat vanes with a surface parallel to the axis of rotation of the extractor. It is however also possible for these parts to be in the form of helical surfaces.

The invention is also embodied in an installation for removing inedible and/or undesirable parts from the neck of slaughtered poultry by the method according to the invention, which installation is at least provided with extraction means, a guide for a chain or cable conveyor carrying slaughtered poultry suspended thereon by the legs, bird positioning and fastening means, drive means for the extraction means, and optionally auxiliary means cooperating with the extraction means.

The installation is expediently so constructed that a flushing pipe discharges into the body cavity of the bird, so that after the extraction operation the bird's interior can be flushed clean. This flushing will obviously be most effective in the case of birds subjected to a head removal operation prior to the extraction process. Flushing with a washing liquid, such as water, has a very advantageous effect on keeping qualities of the bird.

The installation is for this purpose characterized in that the extraction means consist of the abovedescribed extraction means according to the invention. In an advantageous embodiment of the installation according to the invention auxiliary means cooperating with the extraction means are provided, which consist of a holder adapted to be pressed resiliently against the outside of the neck, at least at the site of the crop.

This holder ensures in addition that the parts which are to be removed will come into operative contact with the rotating extractor.

BRIEF DESCRIPTION OF THE DRAWINGS

FIG. 1 is an elevation in perspective of an extraction means,

FIG. 2 is a cross-section, at the level of the cutout in the protective sheath, of the extraction means shown in FIG. 1, FIG. 3 is a diagrammatical representation of the operation of the extraction means according to the invention on a bird, FIG. 4 is a side view of an extraction means and of an auxiliary means, cooperating therewith, in the form of a holder adapted to be resiliently pressed into contact and FIG. 5 is a top plan view of the auxiliary means shown in FIG. 4.

DESCRIPTION OF A PREFERRED EMBODIMENT

In FIG. 1 the reference 1 designates an extraction means consisting of an extractor provided, in the present case, with longitudinal blades 2, and of protection means cooperating therewith, in the form of a protective sheath 3 having a cutout.

The rotation of the extractor can be effected by driving the gear 4 mounted on the shaft of the extractor. Driving can be achieved through cooperation with a toothed member 5, which may for example be provided on the periphery of a grooved drum (not shown).

The reference 6 designates a carrier plate which is joined to the protective sheath and which, as indicated by the arrow 7, can be moved up or down in dependence on the desired height of the extraction means. As previously stated, the height of the extraction means an be adjusted in various ways; one frequently used method consists in that the plate 6, or some other carrier means corresponding to the plate 6, cooperates with a key moving in a grooved drum, thus enabling a programmed vertical adjustment to be made, the bird which is to be processed obviously being positioned at a fixed height relative to the grooved drum.

For the extraction of parts from the neck region the bird, in the correct vertical position relative to the extraction means, is brought into the correct angular position relative to the protection means in the form of the protective sheath.

Through the driving of the carrier plate 6 the extraction means is moved in the axial direction into the neck of the slaughtered bird; when it arrives there, the extraction means will be moved along the surface of the grooved drum to bring about cooperation between the gear 4 and the toothing 5, whereby the extractor is rotated. Through this rotation the parts which are to be removed are picked up through the cooperation of, in the present case, the bladed shaft and the protection means in the form of a protective sheath having a longitudinal cutout. After the rotation and the consequent action of the extraction means, the latter will be moved upwards again until its operative part lies outside the bird's body, where it is cleaned by means of water jets or brushing, optionally while being rotated in the opposite direction.

In FIG. 2 like parts are given the same reference numerals as in FIGS. 1, 2 designating once again the extractor carrying the blades, and 3 the protective sheath provided with a cutout.

The reference numeral 8 designates the blades which can be seen on the operative part, while the reference 9 designates the central stem of the extractor.

FIG. 3 shows very diagrammatically the passage of the extractor through the bird 10.

From a starting position I the extraction means is moved in the axial direction through the positions II and III to position IV.

In position IV the extractor will be rotated, whereby the parts which are to be removed are gripped and picked up.

The extraction means will then by pulled out by a backward movement until position I is reached; the bird is then moved sideways, thus enabling the extractor to be freed of the parts extracted.

FIG. 4 is a side view of a holder adapted to be resiliently pressed into contact and consisting of a fastening block 11, a resilient connecting part 12, and a holder 13. During the crop removal operation the holder 13 lies against the bird's neck at the height of the crop. If desired, control means may be provided to ensure that the holder 13 will lie snugly against the neck when the extraction means is inserted into the bird. The presence of the holder 13 increases the probability of the gripping of the parts which are to be extracted.

FIG. 5 shows once again, in top plan view, the resiliently applied holder 5 shown in FIG. 4.

What is claimed is:

1. An extraction apparatus for removing inedible and undesirable parts from the neck of slaughtered poultry which have been degutted through an opening at the vent comprising:
   means for suspending slaughtered birds by their legs;
   a rotationally drivable extractor surrounded by a non-rotating protective sheath having a cross-section adapted to be passed through the neck of the bird, the protective sheath having a longitudinal cut-out provided in one position; and
   drive means for driving the extractor.

2. Extraction means according to claim 1, in which the rotating extractor and the protective sheath are mounted and joined to be immovable relative to one another in the longitudinal direction.

3. Extraction means according to claim 2, in which the protective sheath is fastened to be adjustable about its longitudinal axis.

4. Extraction means according to claim 2, in which the longitudinal cutout in the protective sheath is disposed at the end remote from the drive side, said end being rounded and closed, while leaving free an opening connected to the longitudinal cutout.

5. Extraction means according to claim 1, in which the rotating extractor is provided, at least at the site of the cutout in the protective sheath, with one or more substantially radially projecting parts, which with a certain clearance extend to the inside of the protective sheath.

6. Extraction means according to claim 5, in which the projecting parts are in the form of blades whose surface is substantially parallel to the axis of rotation of the extractor.

7. Extraction means according to claim 5, in which the projecting parts are in the form of one or more helical surfaces around the axis of rotation of the extractor.

8. An installation system for removing inedible and undesirable parts from the neck of slaughtered poultry which have been degutted through an opening at the vent comprising:
   a conveyor means for carrying slaughtered poultry suspended thereon by the legs;
   a conveyor guide means;
   a rotationally drivable extractor surrounded by a non-rotating protecting sheath having a cross-section adapted to be passed through the neck of the bird, the sheath being provided with a longitudinal cut-out in one position; and
   drive means for driving the extractor.

9. The installation system of claim 8 further comprising an auxiliary holder adapted to be resiliently pressed against the outside of the poultry neck approximately at the site of the crop.

* * * * *